United States Patent
Johnson et al.

(10) Patent No.: US 12,191,046 B2
(45) Date of Patent: Jan. 7, 2025

(54) SYSTEM AND METHOD FOR METALLIC ISOTOPE SEPARATION BY A COMBINED THERMAL-VACUUM DISTILLATION PROCESS

(71) Applicant: BEST THERATRONICS LTD., Ottawa (CA)

(72) Inventors: Richard Ray Johnson, Vancouver (CA); William Z. Gelbart, Vancouver (CA); Brian Abeysekera, Burnaby (CA); Lidia Matei, Saskatoon (CA); Glenn Mcrae, Ottawa (CA)

(73) Assignee: BEST THERATRONICS LTD. (CA)

( * ) Notice: Subject to any disclaimer, the term of this patent is extended or adjusted under 35 U.S.C. 154(b) by 870 days.

(21) Appl. No.: 17/168,672

(22) Filed: Feb. 5, 2021

(65) Prior Publication Data

US 2021/0158987 A1     May 27, 2021

Related U.S. Application Data

(62) Division of application No. 15/502,332, filed as application No. PCT/CA2015/050748 on Aug. 7, 2015, now Pat. No. 10,943,708.

(Continued)

(51) Int. Cl.
    *G21G 1/10*     (2006.01)
    *B01D 5/00*     (2006.01)
    (Continued)

(52) U.S. Cl.
CPC ........... *G21G 1/001* (2013.01); *B01D 5/0057* (2013.01); *B01D 7/00* (2013.01); *B01D 15/08* (2013.01);
(Continued)

(58) Field of Classification Search
None
See application file for complete search history.

(56) References Cited

U.S. PATENT DOCUMENTS 2,086,222 A    7/1937   Harkness
2,872,298 A    2/1959   Van Loenen
(Continued)

FOREIGN PATENT DOCUMENTS

WO    2011092174 A1    8/2011
WO    20120139220    10/2012
WO    20130159201    10/2013

OTHER PUBLICATIONS

Avagyan, et al., Photo-production of (99)Mo/(99m)Tc with electron linear accelerator beam, Nucl Med Biol Sep. 2014, 41(8),p. 705-709 (Year: 2014).*

(Continued)

*Primary Examiner* — Chester T Barry
(74) *Attorney, Agent, or Firm* — Barnes & Thornburg LLP (57) ABSTRACT

A process for the separation of $^{99m}$Tc from molybdenum targets is described. The method for separation of $^{99m}$Tc isotope from molybdenum targets includes: i) providing an initial multicomponent mixture of elements, the mixture containing $^{99m}$Tc; ii) dissolving the multicomponent mixture of elements with an oxidizing agent to oxidize the mixture of elements; iii) heating the mixture of elements at a temperature sufficiently high enough to sublimate a vaporized compound containing $^{99m}$Tc; iv) condensing the vaporized compound containing $^{99m}$Tc to form a reaction product; v) adding a base to the condensed reaction product to dissolve the $^{99m}$Tc containing reaction product to form sodium pertechnetate (Na$^{99m}$TcO$_4$); and vii) purifying the crude solution of sodium pertechnetate Na$^{99m}$TcO$_4$ using (Continued)

column chromatography to provide the $^{99m}$Tc isotope as a radiochemical compound.

11 Claims, 10 Drawing Sheets

Related U.S. Application Data (60) Provisional application No. 62/035,589, filed on Aug. 11, 2014.

(51) Int. Cl.
    *B01D 7/00*     (2006.01)
    *B01D 15/08*     (2006.01)
    *C01G 99/00*     (2010.01)
    *G21G 1/00*     (2006.01)
    *G21G 1/02*     (2006.01)
    *H05H 6/00*     (2006.01)
    *H05H 1/28*     (2006.01)

(52) U.S. Cl.
    CPC ......... *C01G 99/003* (2013.01); *C01G 99/006* (2013.01); *G21G 1/02* (2013.01); *G21G 1/10* (2013.01); *H05H 6/00* (2013.01); *C01P 2006/80* (2013.01); *G21G 2001/0042* (2013.01); *H05H 1/28* (2013.01)

(56) References Cited

U.S. PATENT DOCUMENTS

| | | | |
|---|---|---|---|
| 3,270,432 A | | 9/1966 | Barbareschi |
| 3,291,703 A | | 12/1966 | Dvonch et al. |
| 3,456,672 A | | 7/1969 | Dodson et al. |
| 4,017,583 A | | 4/1977 | Motojima et al. |
| 4,123,498 A | | 10/1978 | Rosenbaum et al. |
| 4,664,869 A | | 5/1987 | Mirzadeh et al. |
| 5,279,360 A | | 1/1994 | Hughes et al. |
| 5,802,438 A | * | 9/1998 | Bennett .............. G21G 1/12 423/2 |
| 5,802,439 A | * | 9/1998 | Bennett .............. G21G 1/12 423/2 |
| 2006/0004491 A1 | | 1/2006 | Welch et al. |
| 2008/0035542 A1 | | 2/2008 | Mourtada et al. |
| 2009/0162278 A1 | | 6/2009 | Ravn et al. |
| 2012/0307954 A1 | * | 12/2012 | Baurichter .............. G21G 1/10 376/195 |
| 2013/0301769 A1 | | 11/2013 | Schaffer et al. |
| 2017/0231080 A1 | | 8/2017 | Johnson et al. |

OTHER PUBLICATIONS

Mohrig, Techniques in Organic Chemistry, 3rd Edn., W H Freeman and Co., 2010, (Year: 2010).*
Canadian Office Action for Application No. 2,956,968, dated Oct. 21, 2022, 6 pages.
Canadian Office Action for Application No. 2,956,968, dated Nov. 25, 2021, 7 pages.
Canadian Office Action for Application No. 2,956,968, dated Jun. 15, 2021, 8 pages.
W. Gelbart et al., "Solid Target Irradiation and Transfer System," AIP Conference Proceedings, 1509, cover page and pp. 141-145 (2012).
Matei et al., "A new approach for manufacturing and processing targets used to produce 99mTc with cyclotrons," Conference Paper, ResearchGate, 8 pages, Aug. 2015.
Matei et al., "Molybdenum targets for production of 99mTc by a medical cyclotron," Abstract, 15th International Workshop on Targetry and Target Chemistry, Prague, Czech Republic, 2 pages, Aug. 18-21, 2014.
Matei et al., "Thermal separation of 99mTc from Molybdenum targets," Abstract, 15th International Workshop on Targetry and Target Chemistry, Prague, Czech Republic, 4 pages, Aug. 18-21, 2014.
Matei et al., "Molybdenum targets for production of 99mTc by a medical cyclotron," Poster, 15th International Norkshop on Targetry and Target Chemistry, Prague, Czech Republic, 1 page, Aug. 18-21, 2014.
Matei et al., "Thermal separation of 99mTc from Molybdenum targets," Presentation, National Research Council, ::>ttawa, Canada, 26 pages, Aug. 12, 2014.
Matei et al., "Thermal separation of 99mTc from Molybdenum targets," Presentation, 15th International Workshop on Targetry and Target Chemistry, Prague, Czech Republic, 20 pages, Aug. 18-21, 2014.
PCT Search Report and Written Opinion completed by the ISA/CA on Oct. 13, 2015 and issued in connection with PCT/CA2015/050748.
Canadian Office Action for Application No. 2,956,968, dated Oct. 24, 2023, 6 pages.

* cited by examiner

SYSTEM AND METHOD FOR METALLIC ISOTOPE SEPARATION BY A COMBINED THERMAL-VACUUM DISTILLATION PROCESS

CROSS REFERENCE TO RELATED APPLICATION

This application is a divisional of U.S. Non-Provisional application Ser. No. 15/502,332, filed Feb. 7, 2017, now U.S. Pat. No. 10,943,708, which is a U.S. nationalization under 35 U.S.C. § 371 of International Application Serial No. PCT/CA2015/050748, filed Aug. 7, 2015, which claims priority to U.S. Provisional Application Ser. No. 62/035,589, filed Aug. 11, 2014, which is incorporated by reference herein in its entirety, the disclosures of each of which are expressly incorporated herein by reference in their entirety.

FIELD OF THE INVENTION

The invention relates to radioisotope production, and more particularly to apparatuses and methods for separation and isolation of clinical scale technetium-99m (Tc-99m) from molybdenum-99 (Mo-99) and other metals after the production of Tc-99m from molybdenum targets by cyclotrons.

BACKGROUND

Radioactive isotopes are widely used in medicine for diagnostic procedures. The most prominent of these radioisotopes is molybdenum-99 (Mo-99), which is used as a precursor for producing Tc-99m. The technetium-99m (Tc-99m) isotope is used in more than 80% of nuclear imaging tests for detecting cancer, heart disease and other medical conditions. Each day, hospitals and clinics around the world typically use Mo-99/Tc-99m in over 60,000 diagnostic procedures.

Technetium-99m ("Tc-99m" or $^{99m}Tc$) is the daughter isotope of $^{99}Mo$ produced by fission in a nuclear reactor. Due to the ongoing supply disruption of $^{99}Mo$ from aging and soon to be shut down nuclear reactors, alternative production technologies have been developed for the production of $^{99m}Tc$. The cyclotron technology typically involves the irradiation of \ enriched molybdenum target material ($^{100}Mo$) with protons to produce a $^{99m}Tc$ via a (p, 2n) reaction. After irradiation, the target material must be chemically processed in order to separate the $^{99m}Tc$ as a radiochemical compound for clinical applications.

Various initial studies performed to assess the chemical composition of the proton irradiated target have shown the presence of niobium (Nb), molybdenum (Mo) and technetium (Tc) isotopes. In order to provide a pharmaceutical grade radiochemical compound, a reliable separation technology and process is typically desired. In the early studies of the cyclotron production and separation of $^{99m}Tc$, the post-irradiation separation process has been performed on laboratory scale units based on the Aqueous Biphasic Extraction Chromatography (ABEC) method. The ABEC method was developed for technetium-99 oxides removal from nuclear waste. The technology requires dissolving the irradiated target and converting the obtained peroxo-molybdates and pertechnetates into ammonium molybdate and ammonium pertechnetate solution. The solution is then loaded into a small ABEC cartridge and, after multiple washings, the pertechnetate is eluted with water as sodium pertechnetate in a water solution. The radiopharmaceutical formulation typically requires an additional step of adding a saline solution. For low-scale production of $^{99m}Tc$ by a cyclotron (milligram quantities of target material), the ABEC technology typically provides relatively high separation efficiencies.

Alternatively, physical separation has been considered for Mo/Tc separation. For example, U.S. Pat. No. 5,802,439 assigned to Bennett et al. developed a Mo/Tc thermal generator, a so-called "Mo goat", for Mo/Tc separation in the production of $^{99m}Tc$ based on linear accelerator technology. Linear accelerators are typically used to produce $^{99}Mo$ via a $^{100}Mo(\gamma,n)^{99}Mo$ reaction in a linear accelerator. The obtained $^{99}Mo$ is oxidized with nitric acid ($HNO_3$) and loaded into a cavity of a thermal separation system, which is milked regularly and $^{99m}Tc$ is eluted as pertechnetate. After 5 days of elution, the system is transported for refill to the generator producer. The technology described by Bennett in U.S. Pat. No. 5,802,438 appears to provide a feasible solution for low specific activity produced $^{99}Mo$. For example, a small scale system for a Mo/Tc separation method describing a three components quartz sublimator for production of $^{94m}Tc$ has been reported previously in the literature. The irradiated target is introduced on the bottom part of a quartz tube system and heated up to 1100 degrees Centigrade (° C.). The formed molybdenum oxides are recovered as crystals in the middle part of the sublimation system while $^{94m}Tc$ is washed from the inner vertical quartz tube. This system and method can be used relatively successfully for manual separation when small radioactivity doses are handled.

In addition, a thermal separation for processing proton irradiated Mo is presented in International Patent Application Publication No. WO 2011/092174 A1. It is disclosed that the irradiated target material is heated over 400° C. in an oxygen atmosphere. If conducted at temperatures below 560° C. for the thermal oxidation of Tc to Technetium heptoxide ($Tc_2O_7$), the oxidation process maybe incomplete leading to the formation of lower oxidation state $^{99m}Tc$ compounds. Thus, the radiochemical purity of collected product can be altered or the process can occur with poor separation efficiency. The WO 2011/092174 A1 publication describes a method for the direct oxidation of the irradiated target. Also, the oxidation process as described therein appears not be applicable when the target material is deposited on a copper support because of the competitive oxidation process between copper and other components of the target.

Therefore, there is a need for an efficient automated method and system to overcome the aforementioned drawbacks. It is therefore desirable to provide an automated apparatus and method for the routine production of a highly pure sodium pertechnetate ($Na^{99m}TcO_4$) from a molybdenum target for rapid use in nuclear medicine centers.

Thus, a method, apparatus and system for metallic isotope separation by a combined thermal-vacuum distillation process addressing the aforementioned problems is desired.

SUMMARY OF INVENTION

Embodiments of methods, apparatuses and systems relate to an automated system and to methods to separate Tc from a copper/molybdenum/technetium ternary system based on a combined vacuum evaporation and thermal distillation process.

In an embodiment, an improved process for the separation of $^{99m}Tc$ from molybdenum targets is described. The method for separation of $^{99m}Tc$ isotope from molybdenum targets includes: i) providing an initial multicomponent mixture of elements, the mixture containing $^{99m}$Tc; ii) dissolving the multicomponent mixture of elements in an oxidizing agent to oxidize the mixture of elements; iii) heating the mixture of elements at a temperature sufficiently high enough to sublimate the mixture and generate a vaporized compound containing $^{99m}$Tc; iv) condensing the vaporized compound containing $^{99m}$Tc to form a reaction product; v) adding a base to the condensed reaction product to dissolve the $^{99m}$Tc containing reaction product, such as an anhydride of pertechnic acid $^{99m}$Tc, to form a salt of an acid containing $^{99m}$Tc, such as a salt of $^{99m}$Tc pertechnic acid; vi) collecting the dissolved $^{99m}$Tc reaction product as a crude solution; and vii) purifying the crude solution containing $^{99m}$Tc using column chromatography to provide the $^{99m}$Tc isotope as a radiochemical compound.

In an embodiment, the $^{99m}$Tc containing reaction product is $Tc_2O_7$. In another embodiment, the salt of the $^{99m}$Tc product is sodium pertechnetate ($Na^{99m}TcO_4$) in saline solution.

In another embodiment, an apparatus for separation of radioisotopes is provided which includes: i) a dissolution cell for placing a molybdenum target for heating and dissolution; ii) a thermal separation unit including a reaction vessel to separate radioisotopes; iii) a vacuum line connected to the thermal separation unit to reduce the pressure for sublimation; and iv) a condenser unit connected to the thermal separation unit associated with a collection vial to collect the condensed product.

In another embodiment, the condenser unit is a U-shaped thermal separation tube.

In another embodiment, the apparatus for separation of radioisotopes includes a purification unit, which includes a plurality of chromatographic units and reagent reservoirs.

In another embodiment, the system is designed to be used for routine production of $^{99m}$Tc by a cyclotron and to be installed in a medical unit handling radiopharmaceutical products.

These and other features of the present invention will become readily apparent upon further review of the following specification and drawings.

DESCRIPTION OF THE DRAWINGS

Unless otherwise indicated, similar reference characters denote corresponding features consistently throughout the attached drawings.

DETAILED DESCRIPTION

The disclosure relates to apparatuses and methods for the thermal separation of Technetium-99m ($^{99m}$Tc) from molybdenum targets including the combined vacuum evaporation and thermal distillation processes to isolate $^{99m}$Tc from a multicomponent system that is generated at the molybdenum target.

As used herein, the term "thermal separation" refers to a mass transfer process in which species are separated because of differences in volatility. The term "thermos-chromatography" refers to a process in which the separation occurs in the gas phase, wherein a gas is passed through a negative thermal gradient along a column. Separation of species in the chemical components in gaseous state gas occurs because of their different volatilization temperatures: the less volatile species will condense on the column walls at the higher temperatures and the highly volatile compounds will condense at the lower temperatures. Thus, this difference in volatilization temperature can be used to separate the radioactive isotope from a multicomponent mixture.

The production of radiochemical products as precursors for radiopharmaceutical formulation typically requires multiple steps. The formulation of a radiochemical product as a radiopharmaceutical compound must take into consideration compliance with Pharmacopoeia monographs for the desired product. The manufacturing process of radiopharmaceutical products must be fast compared with the radioactive half-life, easy to operate in a radioactive environment, and reliable for providing a good manufacturing practice (GMP)-compliant compound, for example.

Figure 1:
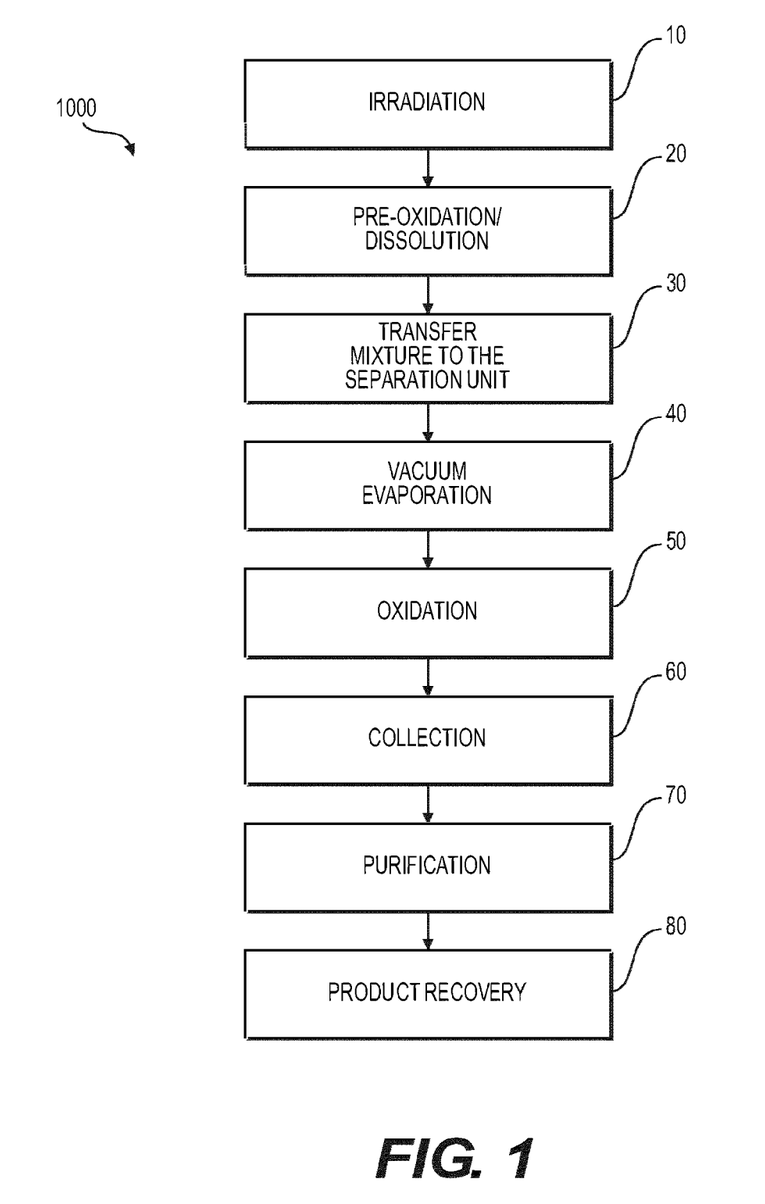
FIG. 1 is a schematic flowchart of an embodiment of an exemplary thermal separation process according to the present invention.

$^{99m}$Tc can typically be directly produced by irradiating a solid molybdenum target material deposited onto a substrate with a proton beam at different energies. Referring to FIG. 1, an embodiment of an exemplary process 1000 for production of medical radioisotopes includes the irradiation of exemplary enriched material to produce the desired isotope (step 10), pre-oxidation and dissolution of the irradiated target material (step 20) into a designated dissolution unit and then transferring the obtained mixture from the dissolution unit to the separation or synthesis unit (step 30). Once the mixture is received in the separation or synthesis unit, the material is evaporated under vacuum (step 40) to remove excess water and then subjected to oxidation (step 50). The volatile compounds generated during the oxidation process are collected (step 60) and thermally separated in an oxidizing atmosphere under gas flow and purified (step 70). The desired $^{99m}$Tc is recovered by using various suitable separation techniques, such as liquid chromatography (step 80).

As illustrated above, the method for separating $^{99m}$Tc isotope from molybdenum targets includes providing an initial multicomponent mixture containing $^{99m}$Tc. The multicomponent mixture of elements is then dissolved in an oxidizing agent to oxidize the mixture of elements. This step is followed by heating the mixture of elements at a temperature sufficiently high enough to sublimate the mixture and generate a vaporized compound containing $^{99m}$Tc. Typically, the next step involves condensing the vaporized compound containing $^{99m}$Tc to form a reaction product. The $^{99m}$Tc is recovered by adding a base to the condensed reaction product to dissolve the $^{99m}$Tc containing reaction product to form a salt of the $^{99m}$Tc product and then collecting the condensed solution of the $^{99m}$Tc product. Finally, the salt of the $^{99m}$Tc product is separated and isolated using column chromatography as a radiochemical compound.

In an exemplary embodiment, the thermal separation process involves isolating the $^{99m}$Tc produced by a cyclotron irradiation from a multicomponent system including Cu (copper), Mo (molybdenum), Tc (technetium) and Nb (niobium) elements. The $^{99m}$Tc is directly produced via a $^{100}$Mo (p, 2n) reaction by irradiating the enriched $^{100}$Mo target material with a proton beam typically at energies between about 10 Megaelectron-volts (MeV) to about 24 MeV with a highest cross section value for production of $^{99m}$Tc in the range of from about 10 MeV to about 15 MeV, for example.

Figure 2:
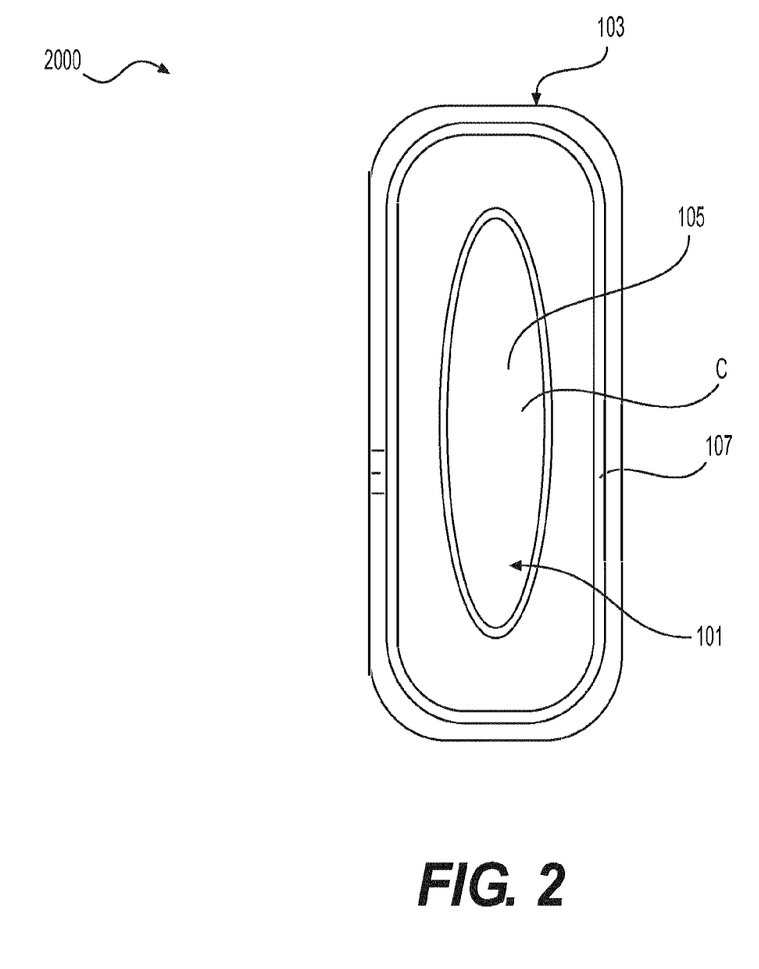
FIG. 2 shows an exemplary molybdenum target for the production of $^{99m}$Tc from a proton bombardment step according to the present invention.

In another embodiment shown in FIG. 2, an exemplary target structure 2000 is illustrated for producing the metallic isotopes for forming $^{99m}$Tc. The target structure 2000 includes a molybdenum target 101 supported on a copper target support plate 103 having an O-ring 107 thereon. An attached enriched $^{100}$Mo target material 105 forms the molybdenum target 101 in a formed cavity "C" of a corresponding shape to the molybdenum target 101 positioned at the center of the target support plate 103. The illustrated molybdenum target 101 and the cavity C can have a generally elliptical shape, but can have other suitable shapes, as can depend on the use or application, and should not be construed in a limiting sense. The exemplary copper support plate 103 can have a generally rectangular shape, or other suitable shape, as can depend on the use or application, and can be passivated with a chemically inert material, which can be, but is not limited to, gold, platinum, palladium, nickel, or combinations thereof. The passivation layer is uniformly thick enough to isolate the copper target support plate 103 during the oxidation process. An exemplary thickness of the passivation layer can be in a range of from about 3 μm (microns) to about 5 μm, for example. The exemplary molybdenum target support plate 103 including the molybdenum target 101 fits on a solid target station or solid target holder installed on a particle accelerator, such as a cyclotron. During irradiation of the $^{100}$Mo target material, a mixture of Mo, Tc and Nb isotopes is typically formed. However, for use in nuclear pharmacies, the $^{99m}$Tc typically must be formulated as sodium pertechnetate with radiochemical purity greater than about 95%, for example.

For a cyclotron production of $^{99m}$Tc, the target molybdenum material is represented by a metallic enriched $^{100}$Mo material deposited on a passivated high-purity oxygen-free copper (Cu) support. During irradiation, metallic technetium (Tc) is generated as a product isotope of $^{100}$Mo following the $^{100}$Mo (p, 2n) $^{99m}$Tc nuclear reaction. The separation process of technetium (Tc) from the other components generated during irradiation occurs when the target support plate 103, desirably as a passivated copper support, including the irradiated molybdenum target 101 is exposed to an oxidizing environment and heated at temperature high enough to generate volatile oxides.

Figure 3:
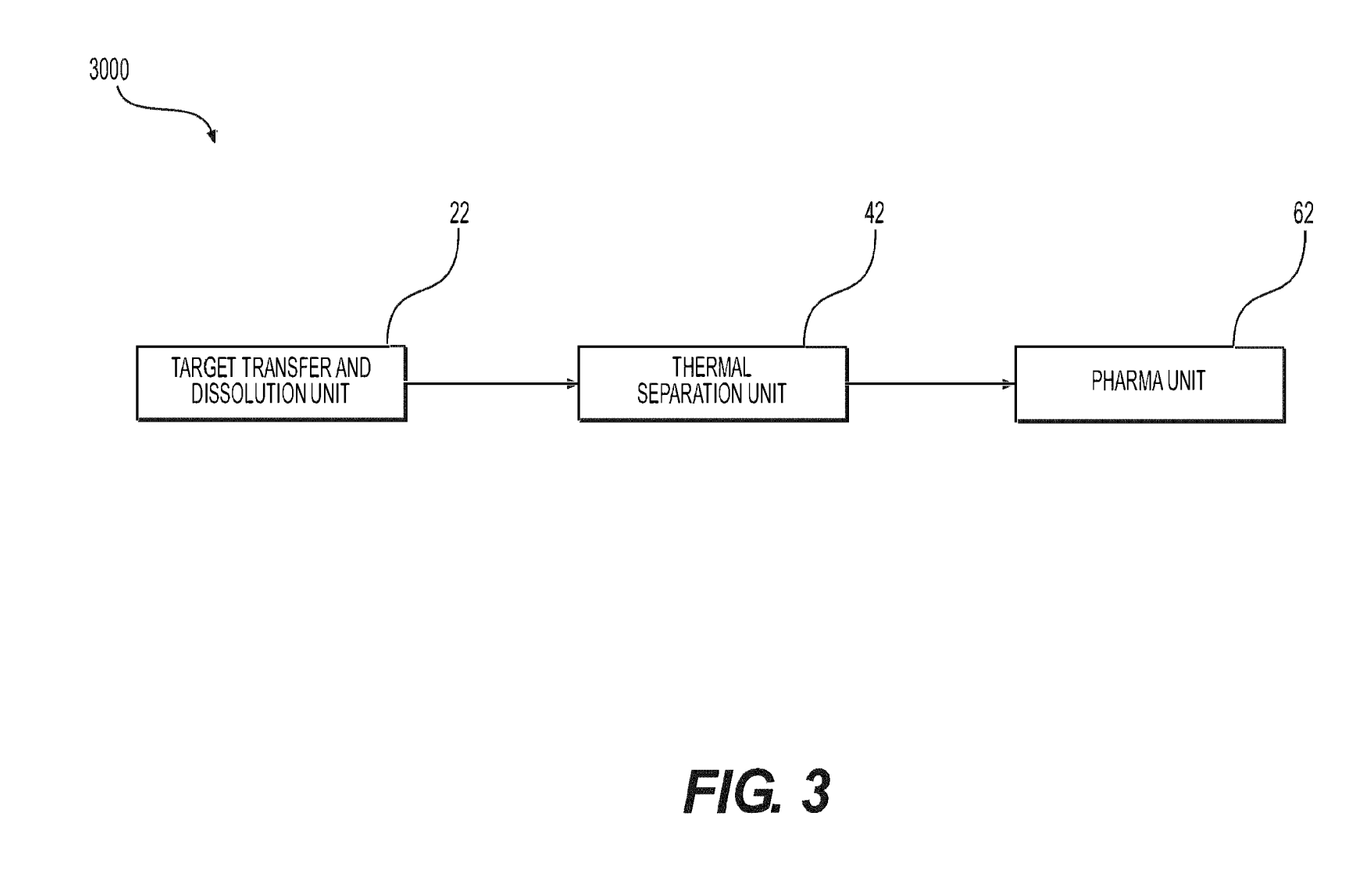
FIG. 3 is a schematic illustration of modular constitutive elements of a separation system according to the present invention.

Referring to FIG. 3, an embodiment of a process 3000 for the production of a radiochemical compound is shown schematically. Once the molybdenum target 101 has been irradiated, it is desirably automatically transferred to a dissolution module 22 including a target transfer and dissolution unit for a partial oxidation or dissolution by adding an appropriate reagent. Non-limiting examples of the dissolving reagent include: hydrogen peroxide ($H_2O_2$), sodium hydroxide (NaOH), nitric acid ($HNO_3$), sulfuric acid ($H_2SO_4$) or various combinations thereof. Dissolution of the target typically occurs in about 5 minutes to 10 minutes, for example. From the dissolution unit or module 22, the dissolved solution is transferred to a thermal separation unit 42 and then to a pharma unit 62.

Figure 4:
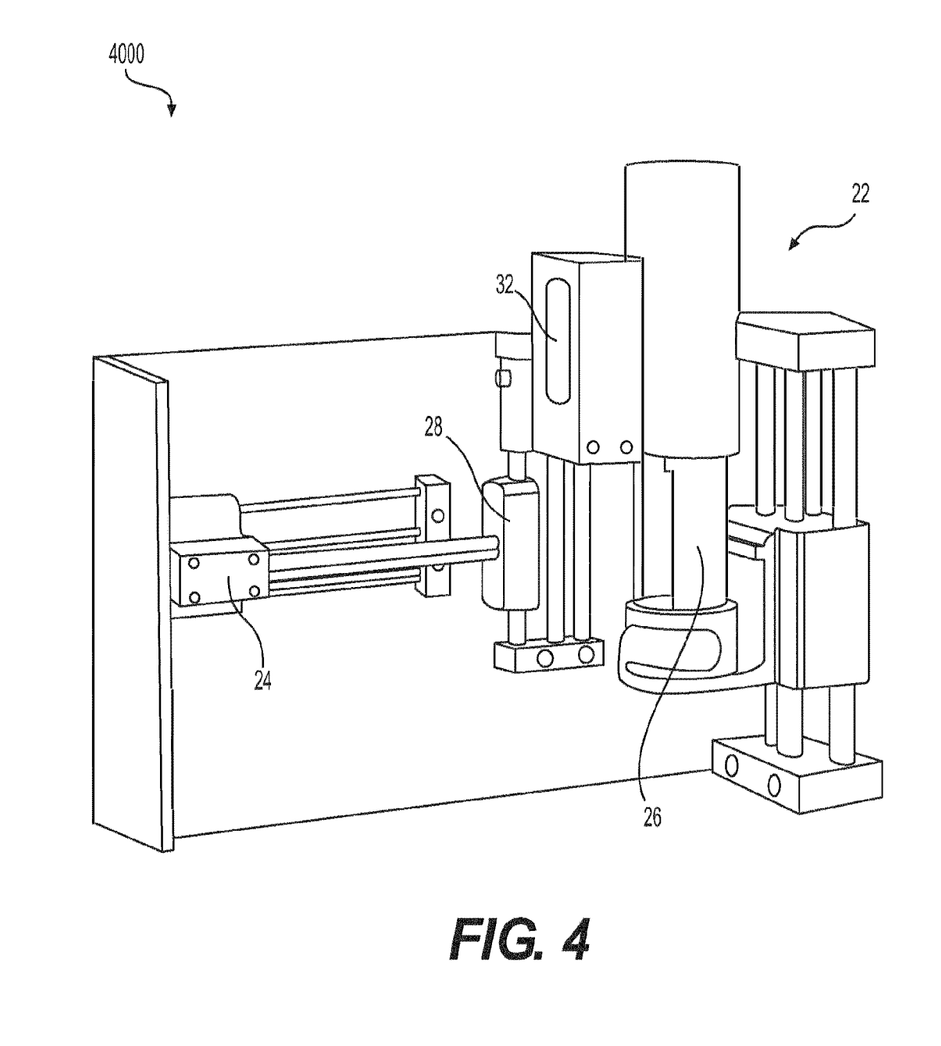
FIG. 4 shows an embodiment of a target transfer unit and a dissolution unit according to the present invention.

In an exemplary embodiment of a target transfer unit and a dissolution unit 4000 as shown in FIG. 4, the target support plate 103 including the irradiated molybdenum target 101 is subjected to pre-oxidation and dissolution steps. Initially, the target support plate 103 including the irradiated molybdenum target 101 is pneumatically transferred to the landing terminal 26. After landing, a pneumatic actuator 24 activates a grabber 28, which holds up the target support plate 103 including the irradiated molybdenum target 101. A dissolution cell 32 is moved down and target support plate 103 including the irradiated molybdenum target 101 is fitted against it. Once the target support plate 103 including the irradiated molybdenum target 101 has been secured, the partial oxidation/dissolution process is typically initiated by adding an oxidizing agent which can include the following chemicals but is not necessarily limited to $H_2O_2$, $HNO_3$, $H_2SO_4$, or various combinations thereof, which can also be combined with NaOH or $NH_4OH$ during the dissolution process. The isotopic mixture is then transferred to the thermal separation unit 42 as shown in FIG. 3 for further processing. The crude mixture is then transferred to the thermal separation unit 42 of FIG. 3 for a complete or substantially complete oxidation. This separation occurs in the thermal separation unit 42 due to differential volatilization temperatures of different oxides formed during the process.

Referring to the molybdenum (Mo) and technetium (TC) separation, the process involves the initial oxidation of the irradiated molybdenum material by dissolving in $H_2O_2$, evaporating and heating the residue material at a suitable temperature to induce the formation of volatile compounds. The complete oxidation of the elements in the mixture desirably occurs at a temperature range of from about 600° C. to about 1200° C. Typically, the heating is conducted under a reduced pressure created by a vacuum line, for example.

In the presence of oxygen, the existing Tc in the mixture is oxidized when exposed to temperatures greater than 500° C. to its oxide form, $Tc_2O_7$ (boiling point 310.6° C.; melting point 110.9° C.) as the anhydride of the pertechnic acid produced by following the reaction:

$$4Tc(s)+7O_2(g) \rightarrow 2Tc_2O_7(g) \quad (1).$$

The existing Mo in the mixture is oxidized when exposed to temperatures higher than 500° C. to molybdenum trioxide $MoO_3$ by following the reaction:

$$Mo(s)+3/2O_2(g) \rightarrow MoO_3(s) \quad (2).$$

The $Tc_2O_7$ compound has a saturated vapor pressure of 101 kPa (kilo Pascals) at a temperature of 310° C., while the molybdenum trioxide has a similar vapor pressure at a temperature of 700° C. As the volatilization process continues, the formed volatile oxides are carried out by the gas stream through the U-shaped thermal separation tube to the relatively coolest regions as typically dictated by a thermal gradient.

An embodiment of an apparatus for separation of radioisotopes typically includes a dissolution cell for placing a molybdenum target for heating and dissolution and a thermal separation unit including a reaction vessel to separate radioisotopes. Additionally, a vacuum line can be connected to the thermal separation unit to reduce the temperature for sublimation. Also, typically a condenser unit is connected to the thermal separation unit having a collection vial to collect the condensed product for further separation.

Figure 5:
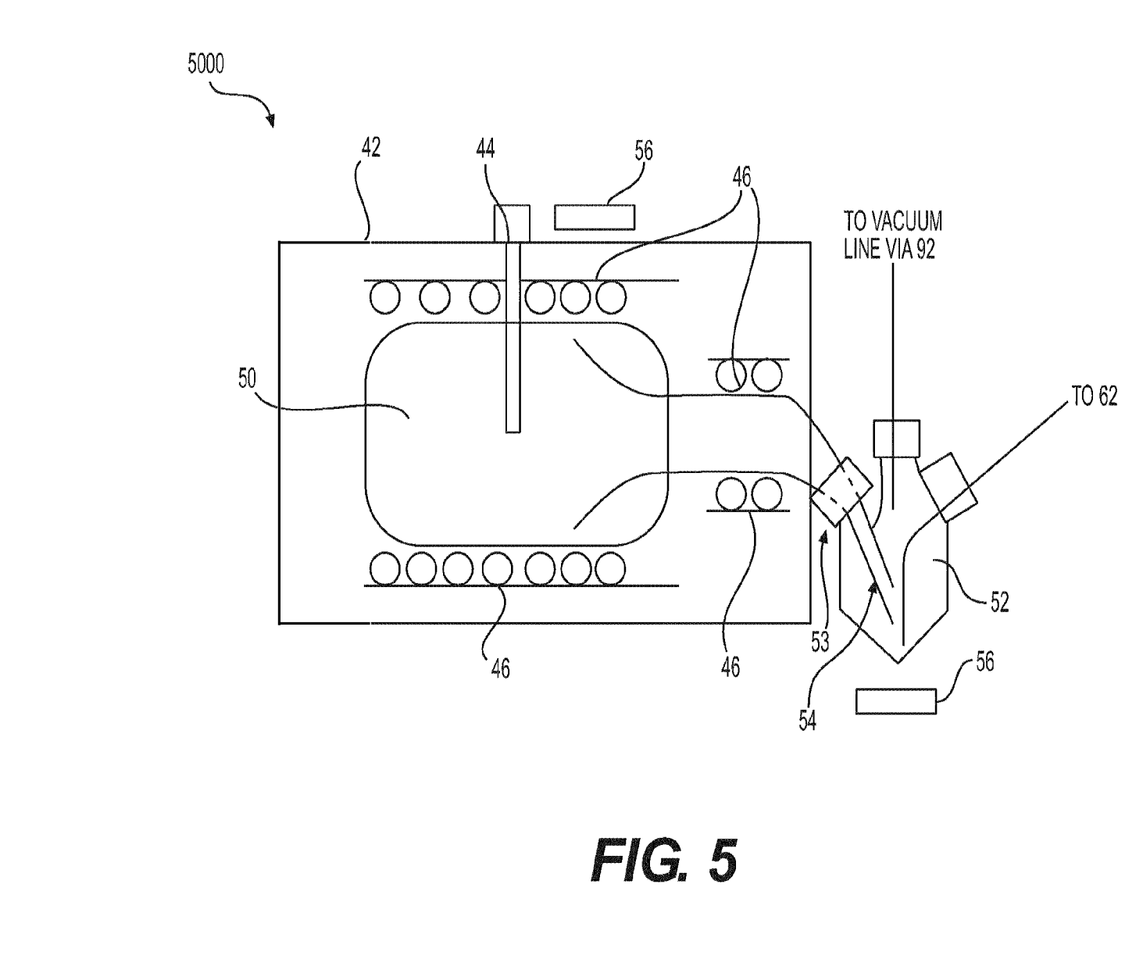
FIG. 5 shows an embodiment of a thermal separation unit for separating the radio-chemicals according to the present invention.

Referring now to FIG. 5, an embodiment of an apparatus 5000 for separation of radioisotopes is illustrated. In the apparatus 5000, the reaction mixture is introduced into the reaction chamber 50 via an admission tube 44. The reaction vial for the oxidation process is made of quartz glass, which can withstand temperatures in the range of from about 30° C. to about 850° C., for example.

The reaction chamber 50 can be manufactured from quartz, ceramics or any other chemically inert material suitable for operation at relatively high working temperatures (such as up to 1200° C.). The reaction chamber 50 is embedded into a ceramic insulation bed including heating elements 46. In an exemplary system, the reaction vessel or reaction chamber 50 is equipped with the admission tube 44 for an isotopic mixture, as well as an oxygen oxidizing gas which can be, but is not limited to, oxygen, air, moistened air, or combinations thereof. In the exemplary system, the reaction chamber 50 can have a diameter of about 50 millimeters (mm), for example. The working temperature is typically controlled by external temperature controllers connected to internal thermocouples, for example. A funnel shape condenser 53 captures the volatile vapors of $Tc_2O_7$ formed during the oxidation process at temperatures higher than 560° C., for example. The exemplary condenser 53 can have a straight region of a larger diameter and followed by an angled region 54 at the exit of the heating zone. For facilitating the vapor collection, the outer diameter of the condenser 53 can be reduced to about 25 mm, for example. The straight region of the condenser 53 will be heated up to a temperature in a range of from about 400° C. to about 600° C. to keep the $Tc_2O_7$ in a gaseous state while the angled region 54 is cooler as well as to maintain a temperature gradient along the thermal separation system. At the same time, the volatile $MoO_3$ oxide remains at a temperature in the region in a range of from about 600° C. to about 700° C. The process optimization trials indicate that the $Tc_2O_7$ vapors are condensed at temperature below 200° C. at the outer end of the heating zone. The end part of the thermal separation system is desirably designed as a straight tube with outer diameter of about 8 mm. The condensed $Tc_2O_7$ vapors dissolved in diluted NaOH solution is transferred to the collection vial. As an anhydride of the pertechnic acid $HTcO_4$, $Tc_2O_7$ shows a relatively high affinity to water. Thus, the $Tc_2O_7$ will be dissolved in a liquid and transformed to $NaTcO_4$, as follows:

$$Tc_2O_7(g) + 2NaOH(aq) \rightarrow 2NaTcO_4(aq) + H_2O(aq) \qquad (3).$$

A collection vial 52 can contain a diluted NaOH solution, or saline, water or any other suitable capturing solution used in pharmaceutical formulation, for example. In other embodiments, the base can be a dilute potassium hydroxide solution, for example. The obtained $NaTcO_4$ is vacuum transferred from the collection vial 52 to the pharma unit 62 for additional purification by liquid chromatography.

In another exemplary embodiment of the apparatus 5000 shown in FIG. 5, the sodium pertechnetate solution can be transferred to a chromatographic column for an additional purification process. This transfer process is typically started after the oxidation is completed and the radioactive detectors indicate the presence of the isotope in the collection vial 52. In an exemplary process, the transfer is completed in about 30 minutes (min) from the start of the synthesis (SOS) time. The radioactivity is monitored during the separation process through radiation detectors 56 placed both in the thermal separation unit 42 and pharma unit 62 as shown in FIG. 6.

Figure 6:
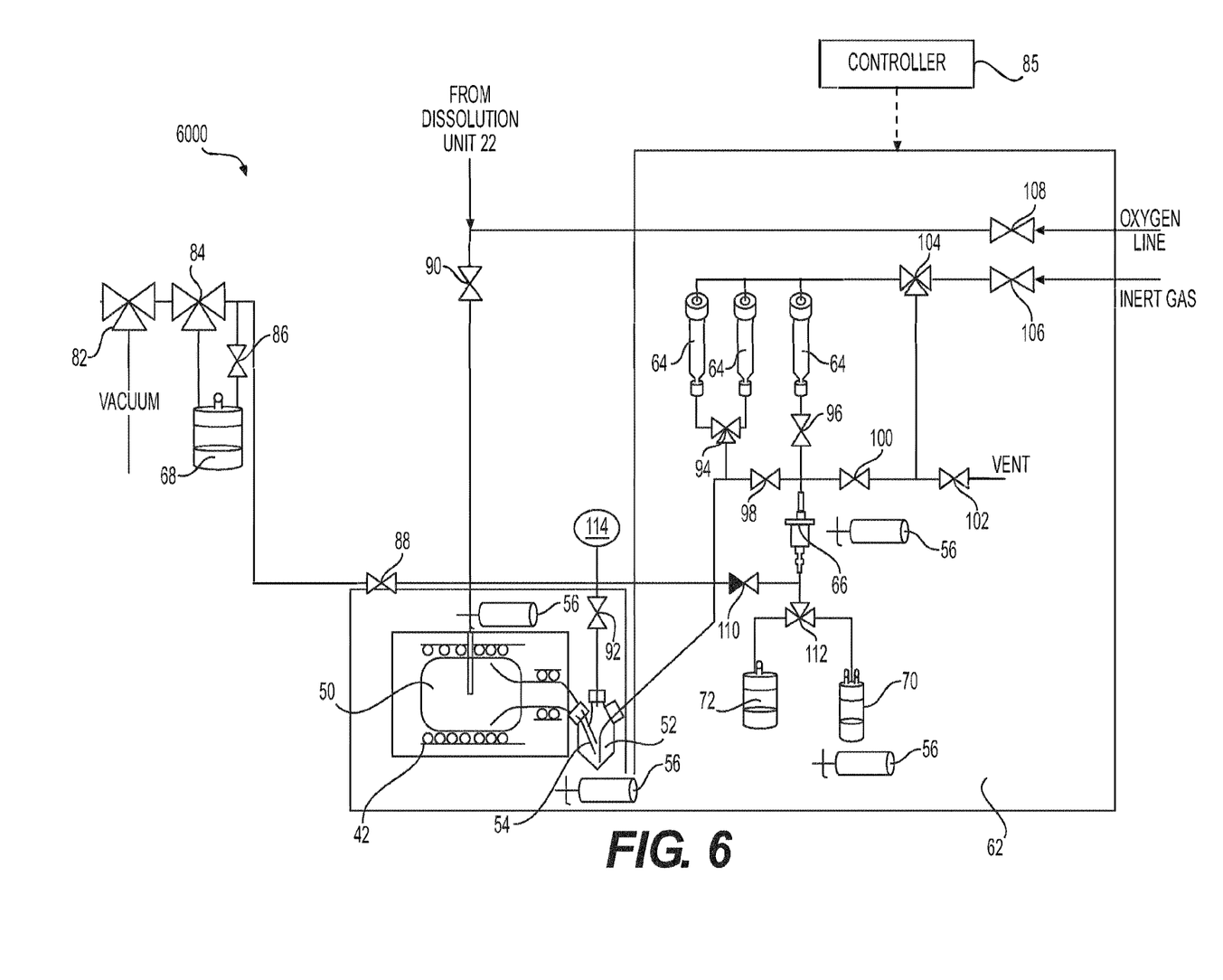
FIG. 6 shows a schematic illustration of an embodiment of a process flow diagram of the thermal separation unit along with the dissolution unit and the separation unit according to the present invention.

Referring now to FIG. 6, there is illustrated an embodiment of an apparatus 6000 including the thermal separation unit along with the dissolution unit and the separation unit. After a complete or substantially complete thermal separation, the anhydride of the pertechnic acid ($Tc_2O_7$) dissolved in the diluted solution of NaOH into collection vial 52 is transferred to the pharma unit 62 equipped with reagent reservoirs 64 and chromatographic cartridges 66 to purify the crude solution of sodium pertechnetate via column chromatography. The vacuum line is applied to the thermal separation unit 42 by opening the valves 82, 84, 86, 88 and 92. The waste vial 68 is a safety vial included to prevent the contamination of the vacuum line with residual radioactive vapors in the system. An oxygen line can be introduced through a valve 108. The oxygen gas flows through the line and combines with the reaction mixture from the dissolution unit of the dissolution module 22 through a valve 90 into the reaction chamber 50.

In an exemplary embodiment, the thermal separation unit and the pharma unit 62 as a purification unit are embedded in a lead shielded enclosure, for example.

In an exemplary embodiment, the radioactivity is monitored during the separation process through the radiation detectors 56 placed in the thermal separation unit 42 and the pharma unit 62, for example.

In an exemplary embodiment, the pharma unit 62 includes solenoid valves 94, 96, 98, 100, 102, 104, 106, 108, 110 and 112 and the reagent reservoirs 64 containing United States Pharmacopeia (USP) grade chemicals used for a pharmaceutical formulation. The radiopharmaceutical precursor is collected in a product vial 70 as a radioactive solution, which is typically detected by the radioactive detector 56 placed in the vicinity of the product vial 70.

In an exemplary embodiment, the sodium pertechnetate solution can be transferred to the chromatographic column for an additional purification process. This transfer can be achieved by opening the valves 98, 110, 88, 82 and 112 to the product vial 70. At the end of the transferring step, the lines are dried by purging inert gas into the system by turning on admission valves 108, 106, 104, 100 and 112 at a pressure in a range of from about 5 psi (pounds per square inch) to about 15 psi, for example.

Typically, in an exemplary embodiment, the separating of the $^{99m}Tc$ is carried out in a thermal gradient under differential pressure conditions, for example.

At the end of the separation process, the compound is formulated as a radiopharmaceutical precursor by adding the United States Pharmacopeia (USP) compliant reagents. The product is recovered into a closed vial as a radiopharmaceutical precursor in the product vial 70.

In another embodiment, the retained radioisotope can be elutriated from the chromatographic column by elution with the reagents from the reservoirs 64 and opening the valve 96 and three way valve 112 to a waste vial 72. Although a saline solution is the desired eluent, other solutions such as $NaHCO_3$, $H_2O$, diluted NaOH, HCl, ethanol or various combinations thereof can be used. In some embodiments, the purification step can include multiple washing steps, for example.

An apparatus for separation of radioisotopes typically includes a dissolution cell, such as the dissolution unit or module 22 for placing a molybdenum target for heating and dissolution; a thermal separation unit, such as the thermal separation unit 42, including a reaction vessel, such as the reaction chamber 50, to separate radioisotopes; a vacuum line connected to the thermal separation unit to reduce the temperature for sublimation; and a condenser unit, such as the condenser 53, connected to the thermal separation unit having a collection vial, such as the collection vial 52, to collect the condensed product.

Figure 7:
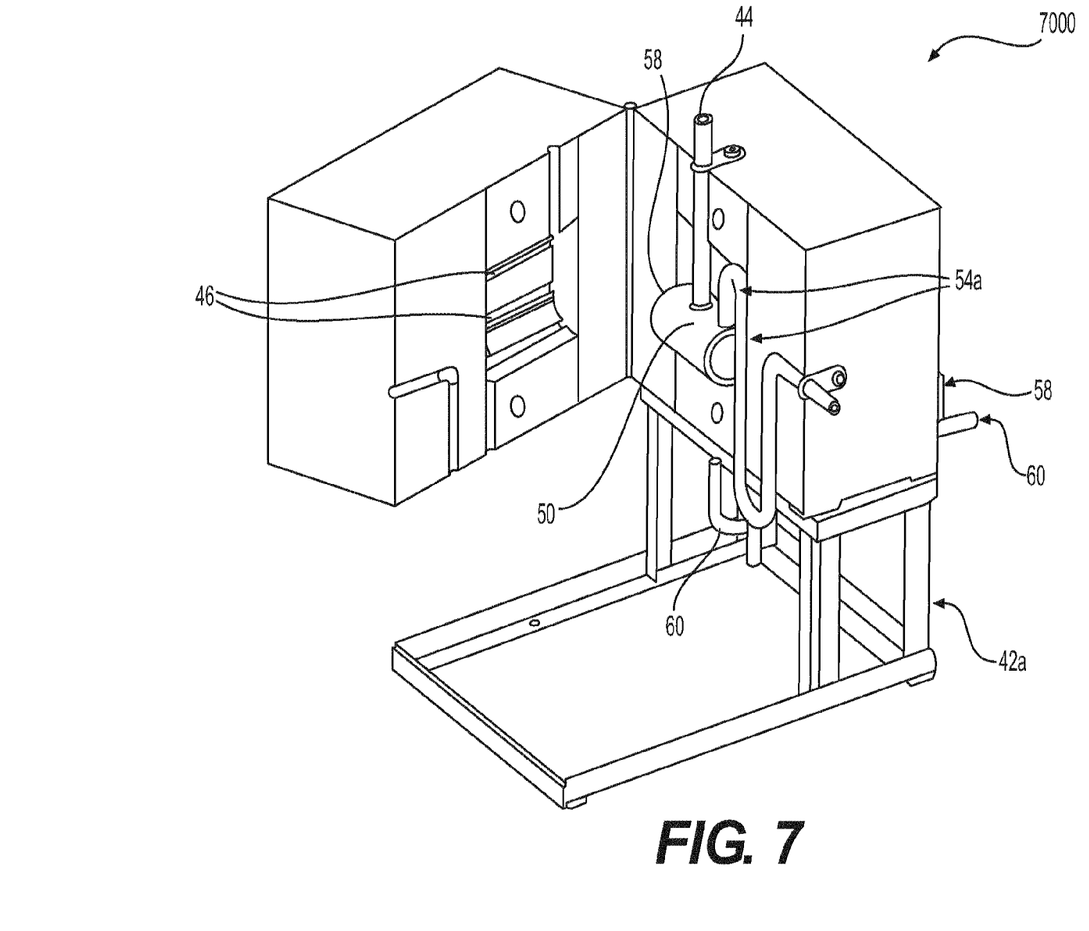
FIG. 7 shows an embodiment of a prototype of a Mo/Tc separation unit comprising a U-shaped thermal separation tube according to the present invention.

In an alternate embodiment, FIG. 7 shows an embodiment of an apparatus 7000 of a prototype of a Mo/Tc separation system with a U-shaped thermal separation tube 54a to isolate the 99mTc. A thermal separation unit 42a of the apparatus 7000 has the same or substantially the same functionality as the thermal separation unit 42 shown in FIG. 5. The length of the condensation part of the thermal separation tube 54a desirably has been increased and designed in a U-shape in such a way to reduce the size of the thermal separation unit 42a and to keep its functionality during the 99mTc separation, for example. The isotopic mixture obtained after the target dissolution is transferred to the thermal separation unit 42a through the admission port 44 directly to the reaction chamber 50. The heating elements 46 are embedded in the ceramic block on both sides of the thermal separation unit 42a. The temperature inside the reaction chamber 50 is monitored by an embedded thermocouple 58 and controlled through an external temperature controller. Thermocouple 58 is initially covered by the liquid and its reading will not exceed the boiling point of the liquid, as long as the liquid is present. Once the liquid boiled away, the thermocouple 58 readings will record the temperature inside the reaction chamber 50 and the increase of temperature from steady state (during boiling) shall indicate the end of the boiling process. For the purpose of controlling the chamber temperature during the boiling process, a separate thermocouple placed outside the chamber (not shown), but within the heating zone, monitors the temperature and regulates it to achieve the optimal rate of boiling (too slow will increase the processing time, too vigorous will place some liquid in the distillation tube 54a).

In an exemplary embodiment, the admission tube or admission port 44 is coupled directly to a dissolution cell, for example. Typically, the admission tube is coupled to an oxygen line.

In an exemplary embodiment, the condenser unit, such as the condenser 53, has a variable diameter and is angled to a collection flask, such as the collection vial 52, located outside the thermal separation unit 42a, for example.

The reaction chamber 50 and the thermal separation column 54a can be made from quartz, ceramic or other chemically inert material suitable for operation at relatively high working temperatures (such as 1100° C.). Once the separation is completed, the reaction chamber 50 is cooled rapidly with forced air through a ventilation tube 60 located in the bottom part of the separation unit. In an exemplary embodiment, the collection vial, such as the collection vial 52, is coupled to a vacuum line, for example.

Figure 8:
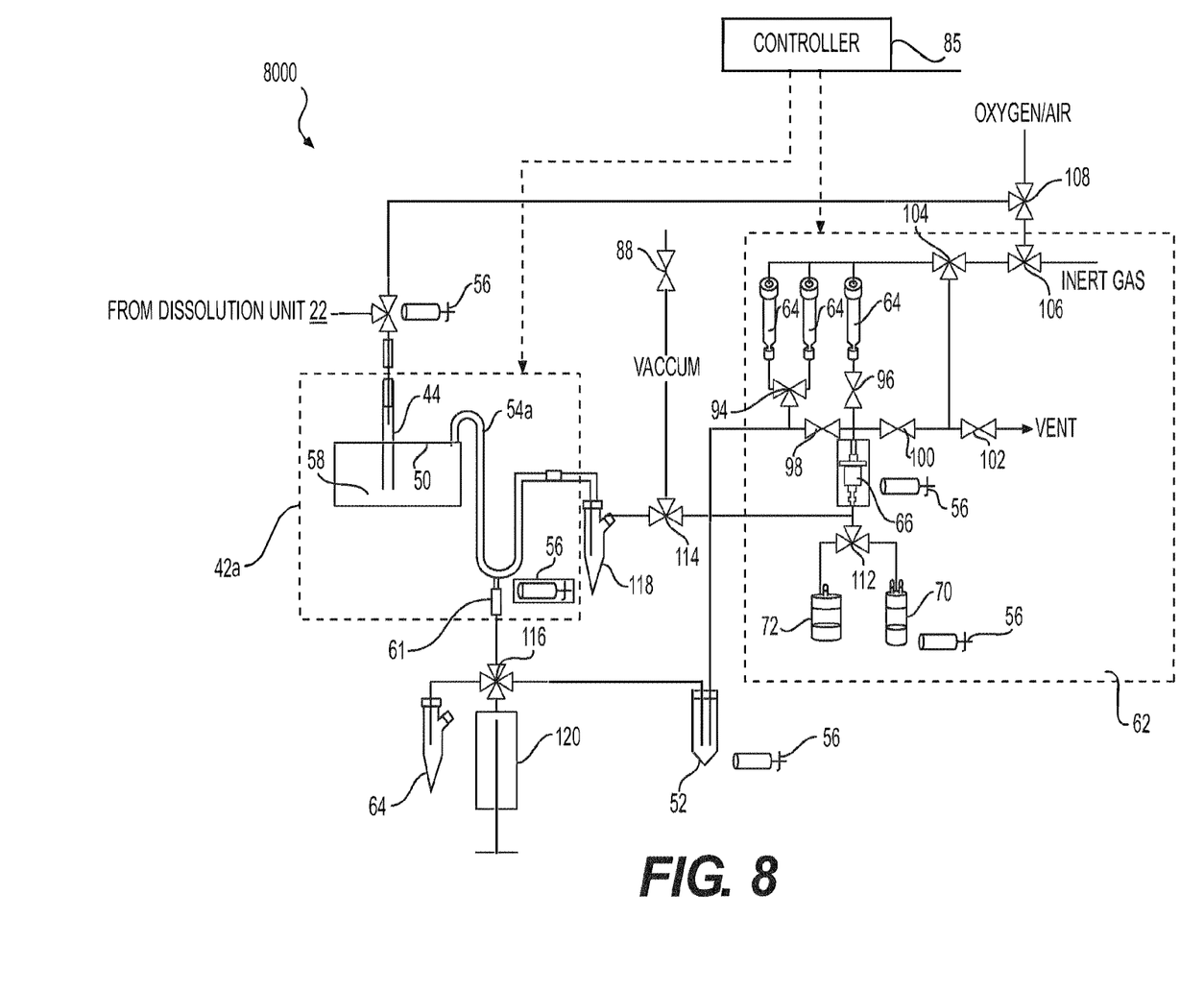
FIG. 8 shows a schematic illustration of an embodiment of a process flow diagram of the thermal separation unit having the automated injection system according to the present invention.

Referring to the FIG. 8, there is illustrated an embodiment of an apparatus 8000 including the thermal separation unit along with the dissolution unit and the separation unit corresponding to the apparatus 7000 of FIG. 7. After the isotopic mixture is introduced in the separation unit 42a, the evaporation process is started at a temperature of about 100° C. under a vacuum by opening the valves 88 and 114. The water is collected in a collection vial 118 located at the end of the thermal separation column 54a. The evaporation is typically completed in less than about 10 minutes, for example. The oxidation starts with heating the reaction chamber 50 at a temperature of about 700° C. under an oxidizing atmosphere at a flow rate in a range of from about 10 milliliters/minute (mL/min) to about 20 mL/min monitored through a flow-meter attached to an oxidizing gas line. The oxidizing process is completed in typically less than 20 minutes, for example. The migration of the radioactive vapors of the $^{99m}$Tc ($Tc_2O_7$) is monitored by the radiation detector 56 located at the collection point of the collection vial 52 attached to the injection system through a valve 116. When the radiation detector 56 indicates a maximum value, the reaction chamber 50 is cooled with forced air purged through the ventilation pipe 60. The condensed $^{99m}Tc_2O_7$ is washed from the thermal separation column 54a with alkaline solution which can be, but is not limited to, sodium hydroxide (NaOH), potassium hydroxide (KOH) or mixtures thereof. The washing is made with the aid of an injection system loaded with about 2 milliliters (mL) of a washing solution from the reagent reservoirs 64 through the valve 116 port in the loading position; the liquid is gently pushed through a port 61 recovered through the valve 116 in the unloading position in the collection vial 52. The transfer of the radioactive solution in the collection vial 52 is monitored by the radiation detector 56 calibrated for the gamma energy emission characteristic for $^{99m}$Tc (141 kilo electron volts (keV)) located to detect the radioactivity in the collection vial 52. The crude solution of the radiochemical sodium pertechnetate $Na^{99m}TcO_4$ is then transferred to the pharma unit 62 with a similar functionality to that described with respect to the apparatus of FIG. 6, for example.

In another exemplary embodiment of the process, as shown in FIG. 6 and FIG. 8, the sodium pertechnetate solution can be transferred to the chromatographic column for an additional purification process. This sodium pertechnetate solution is transferred by suction to the pharma unit 62 and loaded into an alumina column where it is eluted using a saline solution. Other types of columns can be used. This transfer is started after the oxidation is completed and the radioactive detectors 56 indicate the presence of the isotope in the collection vial 52. In an exemplary process, the transfer is completed in about 30 minutes from the process start time.

In another embodiment, molybdenum is recovered at the end of the process. The reaction chamber 50 can be washed with ammonium hydroxide or sodium hydroxide solution to convert the $MoO_3$ to ammonium molybdate or alternatively sodium molybdate.

Running the separation procedure at high temperature permits the collection of molybdenum from the reaction chamber 50 for a recycling and reprocessing procedure, for example.

In another exemplary embodiment, the copper can be removed from the system by running a cleanup procedure. As copper does not typically present oxides with volatilization temperatures of 850° C. or below, the traces of copper oxides remain in the reaction chamber 50 and can be removed from the system by running a cleanup procedure, such as with hydrochloric acid. Finally, the system is rinsed with ultra-pure water (Optima LC/MS grade) and dried by purging inert gas through the lines, for example.

In an embodiment, the thermal separation unit 42 and pharma unit 62 are accommodated in a shielded enclosure, such as lead lined aluminum enclosure. For running the separation procedure of $^{99m}$Tc from a multicomponent system including Mo/Tc/Cu, the system described can be automated for remotely controlling the process such as by a controller 85 in communication with the separation apparatus, such as the apparatus 6000 or the apparatus 8000, such as through a ladder logic controller as a programmable logic controller (PLC) for the controller 85 and as can be operated externally and remotely of the system, for example. The controller 85 can include or be associated with a processor for execution of instructions for system control, a memory for storing programs and instructions used by the processor for remote or automatic control and operation of the system of the separation apparatus, and an input device or interface to send or receive information and instructions for system control and operation, for example.

Figure 9:
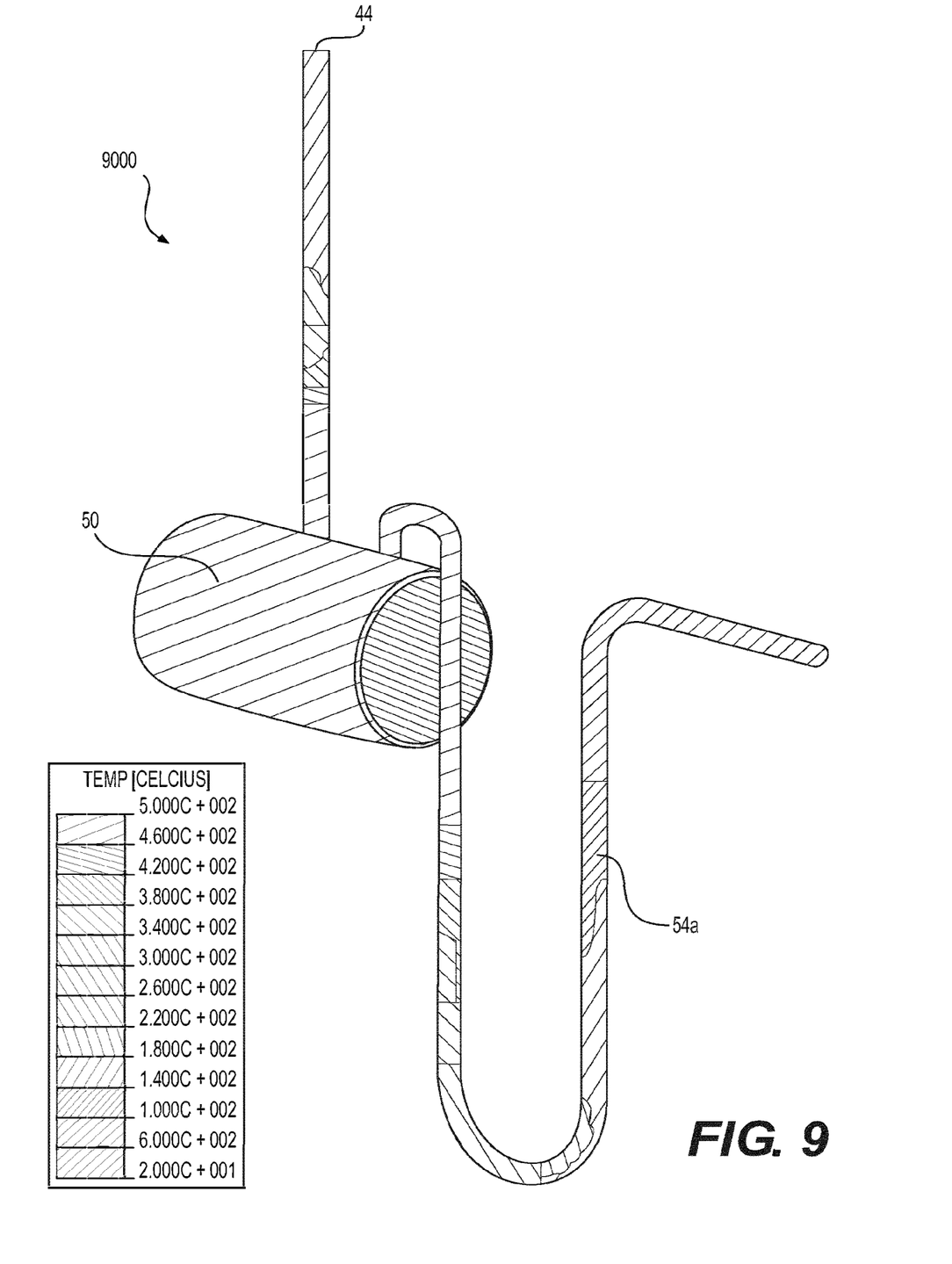
FIG. 9 shows an illustration of the thermal gradient created along the U-shaped thermal separation tube of FIG. 8 according to the present invention.

Referring to FIG. 9, there is illustrated the thermal gradient created along the U-shaped thermal separation tube 54a of the apparatus 8000 of FIG. 8. The thermal gradient is created along the length of the thermal separation tube 54a by heating the reaction chamber 50 at temperatures greater than 600° C., for example. The oxidation gas is flown through the anhydrous isotopic mixture and reaches the temperature of reaction chamber 50. At temperatures greater than 600° C., the Technetium is oxidized to the highest oxidation state (VII) and is converted to its volatile oxide ($Tc_2O_7$). The volatile oxide is carried by the heated oxidizing gas to the coolest regions of the separation column 54a and condenses at the temperatures in the range of temperature of from about 200° C. to about 250° C. reached on the bottom part of the thermal separation tube 54a.

In an embodiment of the apparatus 8000, the injection system is used to collect the condensed material by collection from the bottom part of the condenser unit, such as the condenser 53, for example.

Figure 10:
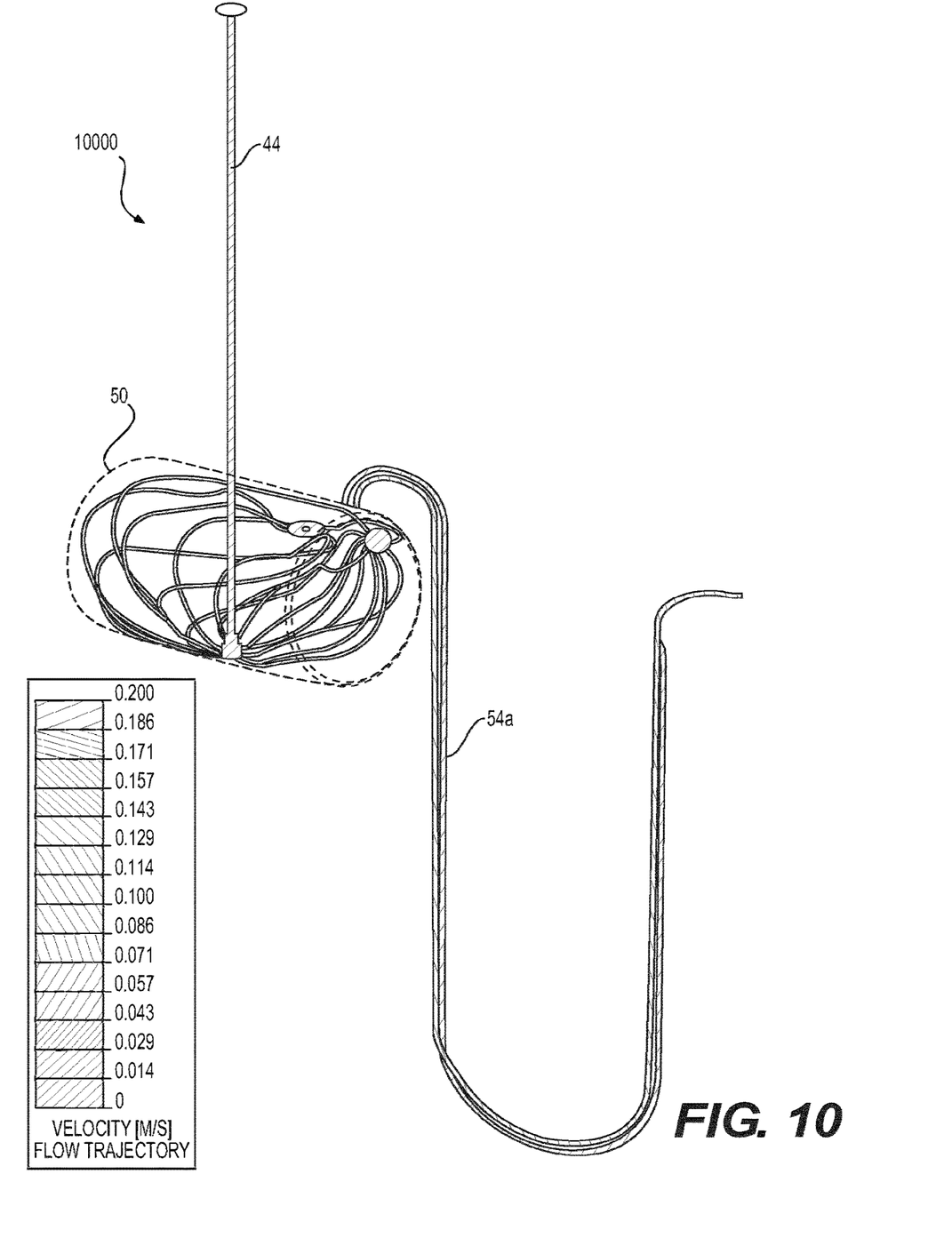
FIG. 10 shows an illustration of the velocity of vaporized compounds along the U-shape thermal separation tube of FIG. 8 according to the present invention.

Referring to FIG. 10, there is illustrated the velocity in meters/second (m/s) of vaporized compounds along the U-shape thermal separation tube of the apparatus 8000 of FIG. 8. A constant or substantially constant flow of the carrier gas (oxidizing agent) in the system, as shown in FIG. 10, can insure the transfer of the formed $Tc_2O_7$ to the relatively coolest area of the separation column 54a.

Referring to the multi component Mo/Tc separation, the oxidation process occurs as a competitive reaction between Cu oxides formation and Mo/Tc oxidation. By direct exposure of a molybdenum (Mo) target support plate in the oxygen flow, the oxidation mechanism typically involves three sequential steps: (1) adsorption of $O_2$ molecules onto a metallic surface; (2) oxidation of metals; and (3) oxide separation based on the volatilization temperatures. The oxidation process of Cu typically involves two phases: the partial oxidation with formation of $Cu_2O$ and total oxidation with formation of CuO. The formation of these two oxides inhibits the formation of $Tc_2O_7$ and its transportation to the cooler regions of the quartz tube forming the separation column 54a; and, hence, its condensation in the region of temperatures below 300° C. About 50% of radioactivity has been found on the target insertion point either as a $Tc_2O_7$: $MoO_3$ mixture or trapped on the copper layers, most probably as $Cu(TcO_4)_2$, embedded in the $Cu_2O$ lattice. This can be explained by the formation of $Cu_2O$ in the first oxidation phase, which is competing with the oxidation of Mo and Tc. A concurrent reaction with an inhibiting effect on the separation process can be the reaction between CuO and $MoO_3$ with formation of $CuMoO_4$ (yellow-green) at a temperature in a range of from about 500° C. to about 700° C., for example.

Significant improvements to reduce the effect of copper on the separation of molybdenum (Mo) and Technetium (Tc) have been made by including the pre-oxidation step in the process. Once the irradiated target is dissolved with NaOH, $H_2O_2$ (hydrogen peroxide) or other oxidative agent including nitric acid ($HNO_3$) or sulfuric acid ($H_2SO_4$), the existing elements are partially oxidized. Hence, molybdenum (Mo) is converted in a mixture of peroxomolybdates and Tc is converted to pertechnetate $[TcO_4]^-$. The partial oxidation of copper in an acidic medium of molybdic ($MoO_4^{2-}$) and pertechnic ($TcO_4^-$) acidic mixture leads to the formation of $Cu^{2+}$ according to the reaction being identified most likely as $Cu(OH)_2$, as follows:

$$Cu(s) + H_2O_2(aq) + 2H^+(aq) = Cu^{2+}(aq) + 2H_2O(l), \qquad (4),$$

with an equilibrium constant of K=1048.6 at 25° C.

The oxidation process of copper by $H_2O_2$ is typically rather slow. For example, 17.5 micrograms/milliliter (μm/mL) of copper has been found in solution after exposing 5 grams of a Cu disk to 8.5 mL of 30% $H_2O_2$ for 30 minutes. This chemical behavior of constitutive elements has been used to improve the exemplary separation system. Thus, the Mo and Tc can be easily dissolved by peroxide or NaOH solution but dissolution of copper occurs at a lower rate. The peroxide solution containing Mo and Tc are evaporated leaving the Mo and Tc for further oxidation by flowing oxygen at relatively high temperatures. Thus, the two step oxidation process essentially eliminates the Cu from the final product. As discussed above, washing with sodium hydroxide (NaOH) at the end of the process resulted in $^{99m}$Tc as Na $^{99m}$TcO$_4$, with recovery of radioactivity greater than 70%, for example.

In an exemplary embodiment, the apparatus, such as described herein, for separating the technetium (Tc) is controlled externally by an operator to separate the radioisotopes, for example.

In an exemplary embodiment, the liquid circulation into the separation process is made though electric actuated valves in the apparatus, such as the valves in the apparatus 6000 and in the apparatus 8000, for example.

In an exemplary embodiment, the apparatus for separation of radioisotopes typically includes an operational procedure that allows molybdenum recovery from the separation process.

Another significant improvement to reduce the contribution of Copper to the Mo/Tc separation process has been made by adding a passive layer of chemically inert material (such as noble metals) on the surface of copper target support plate, such as the target support plate 103. For example, a gold layer having a thickness in a range of from about 3 μm (microns) to about 5 μm (microns) has been electroplated on the copper support as a passivation layer. The molybdenum material, such as a Mo-100 material, is attached to the protected passivated copper target support plate 103. For example, a molybdenum (Mo) target 101 on a copper target support plate 103 having a passivation layer has been dissolved with about 3 mL of a 30% $H_2O_2$ solution and the formation of copper ions in the solution has been checked. No traces of copper have been identified in the solution. In one exemplary embodiment of this thermal separation process, the Mo/Tc/Cu separation process includes the thermal separation unit 42a accommodating a U-shape thermal separation tube 54a designed for separation in a temperature gradient.

The following examples are provided to illustrate the operational use of the described embodiments of exemplary systems and processes for a Mo/Tc thermal separation, but should not be construed in a limiting sense.

Example 1

Mo/Tc thermal separation performed on a simulated multi component system. A mixture obtained from dissolution of Mo target from a copper plate with about 5 mL of 30% $H_2O_2$ has been spiked with commercially available $^{99m}Tc$. The volume of the obtained solution has been reduced to 3 mL by gentle evaporation and introduced in the reaction chamber 50. The temperature was set at 120° C. and the vacuum pump was turned on. After about 15 min the evaporation is complete as it can be observed by a temperature increase at the end of the process. After the evaporation step ended, the temperature was raised to 700° C. and oxidizing gas was introduced at a flow rate of about 10 mL/min to 20 mL/min through the radioactive mixture containing commercial available $^{99m}Tc$ (Isologic) as sodium pertechnetate in saline solution. The radioactivity has been monitored at the collection port 61 of the apparatus 8000 in FIG. 8 by placing a shielded Geiger-Muller (GM) tube, with a 2 (centimeters) cm thick lead collimator with a radius of about 2 cm. The process continued for about 30 minutes. At the end of the process, about 70% of introduced radioactivity has been moved from the reaction chamber 50 and located in the thermal separation column 54a. The formed $Tc_2O_7$ anhydride deposited on the walls of the thermal separation column 54a was collected by quantitative rinsing with about 5 mL of 0.1M NaOH. The radiochemical purity analysis performed by radio Thin Layer Chromatography (radio TLC scanning system Bioscan, stationary phase: iTLC paper plate Silica; mobile phase: acetone) on the collected $Na^{99m}TcO_4$ was greater than 95%.

Example 2

Mo/Tc thermal separation from a multicomponent isotopic mixture obtained via a $^{100}Mo(p,2n)^{99m}Tc$ nuclear reaction generated on a $^{100}Mo$ target.

192.5 mg Mo-100 (Isoflex, 99.03%) target material was deposited as a pellet with the diameter of 0.8 cm onto a 2.5 cm diameter copper disc (oxygen free) to produce $^{99m}Tc$ by the nuclear reaction $^{100}Mo(p,2n)^{99m}Tc$. The disc was irradiated for 30 minutes with a 15 MeV proton beam produced by a particle accelerator. The current intensity of about 65 μA (microamperes) was used. After irradiation, the activity detected on the disc was about 34.5 GBq (Giga Becquerel) counted at 90 minutes end of bombardment (EOB) and drastically decreased in the first two hours from EOB indicating the presence of high amounts of short half-life isotopes such as: $^{94m}Tc$ ($T_{1/2}$=52.01 min), $^{96m}Tc$ ($T_{1/2}$=51.51 min), $^{97}Nb$ ($T_{1/2}$=72 min). At the end of the process, the irradiated target was dissolved with 5 mL 30% $H_2O_2$ and the volume reduced to about 2 mL. The isotopic mixture containing Mo, Tc, Nb and Cu was transferred to the reaction chamber 50. The vacuum evaporation was completed in about 10 minutes at the temperature of 120° C. After completion of the evaporation phase, the oxidation started at the temperature of 700° C. in the presence of oxygen ($O_2$) gas at a flow rate of 20 mL/min. The oxidation process was run for about 30 min. At the end of the process, Tc was collected from the thermal separation column 54a by quantitative rinsing with about 5 mL of 0.1M NaOH. The radiochemical analysis performed on the purified product by radio Thin Layer Chromatography (radio TLC scanning system Raytest mini Gita, stationary phase: Silica Gel-PET plates Polygram SILG, mobile phase acetone) indicating the presence of 99mTc as pertechnetate Retention Factor ($R_f$) =0.9±0.1.

Surprisingly, embodiments of the thermal separation process can provide several advantages. Since embodiments of the described thermal separation apparatus can be automated, it can be an online system which can be relatively easy to operate and can be remotely controlled, for example. Also, the thermal separation apparatus is relatively compact and can be installed inside a relatively small hot cell near a nuclear medicine center, which can be advantageous for continued operation. Moreover, embodiments of the processes can be modified for other thermal separation processes, such as Iodine-124, and should not be construed in a limiting sense. Additionally, the embodiments of the processes can use a reduced number of chemicals and reagents used in the separation process, and advantageously can typically avoid the use of limited and expensive purification resins, for example.

Also, the final separated product $Na^{99m}TcO_4$ from the separation process was highly pure containing only the Tc isotopes with no apparent traces of zinc, copper or contaminating metals, for example.

A sample aliquot of the separated product of the described process has been used to produce a point source with the activity of about 370 kBq (kilo Becquerel) which was assessed to determine the radionuclidic composition of the purified product by gamma spectrometry performed on a Gamma Spectrometer (Baltic Scientific Instruments, hyper pure germanium (HPGe) coaxial detector, p type, equipped with Interwinner Software).

As a result of the assessment and determination, only Technetium isotopes have been identified in the analyzed sample, as shown in Table 1 below.

TABLE 1

Radioisotopic Ratio of Identified Nuclides in the purified $^{99m}Tc$ Solution

| Isotope | Half life | Ratio/$^{99m}Tc$ (%) Experimental |
|---|---|---|
| $^{93}Tc$ | 2.75 hrs | <DL |
| $^{94}Tc$ | 4.88 hrs | 0.0213 |
| $^{95}Tc$ | 20.1 hrs | 0.0209 |
| $^{96}Tc$ | 102.72 hrs | 0.0062 |
| $^{97}Tc$ | 4.2 × 10$^6$ years | <DL |
| $^{99}Mo$ | 66.01 hrs | <DL |
| Total Mo_Tc impurities | | 0.05 |
| Radionuclidic purity of purified $^{99m}Tc$ (%) | | 99.95 |

The obtained radioisotopic profile of the assessed sample aliquot of the separated product was analyzed against the gamma spectrum acquired from an identical aliquot (point source 370 kBq) sampled from the crude solution. The presence of Niobium isotopes Nb-97 ($T_{1/2}$=72 min) were identified in the raw material (ratio Nb-97/Tc-99m 2.07%) in the spectrum acquired at 368 min EOB. However, the presence of other Nb isotopes (e.g., Nb-95) could not be certified in the given sample. In a highly oxidative environment niobium (Nb) is oxidized as $Nb_2O_5$ and remains in solid state in the reaction chamber. Niobium pentoxide ($Nb_2O_5$) was not retrieved in the rinsing solution of the reaction chamber 50 as the reaction between $Nb_2O_5$ and NaOH with the formation of sodium niobate ($NaNbO_3$) occurs at temperatures higher than 200° C.

We claim:

1. A method for separating a $^{99m}$Tc isotope from a molybdenum target, the method comprising the steps of:
   providing an initial multicomponent mixture of elements from the molybdenum target, said mixture containing $^{99m}$Tc;
   oxidizing said multicomponent mixture of elements with an oxidizing agent to oxidize the multicomponent mixture of elements, wherein the oxidation occurs at a temperature range of from about 800° C. to about 1200° C.;
   sublimating said oxidized multicomponent mixture of elements to generate a vaporized compound containing a volatile oxide of $^{99m}$Tc;
   condensing the vaporized compound containing the volatile oxide of $^{99m}$Tc in a condenser unit to form a condensed reaction product;
   adding a base to the condensed reaction product to form a pertechnetate;
   collecting said pertechnetate as a crude solution; and
   purifying the crude pertechnetate solution using column chromatography to provide the $^{99m}$Tc isotope as a radiochemical compound.

2. The method of claim 1, wherein the oxidizing agent is selected from the group consisting of $H_2O_2$, $HNO_3$ and $H_2SO_4$.

3. The method of claim 1, wherein said oxidizing said multicomponent mixture of elements is conducted under a reduced pressure created by a vacuum line.

4. The method of claim 1, wherein the base is either a dilute sodium hydroxide or a potassium hydroxide solution.

5. The method of claim 1, wherein the $^{99m}$Tc isotope is produced during irradiation of a solid molybdenum target with a proton beam at different energies.

6. The method of claim 1, wherein said multicomponent mixture of elements comprises molybdenum, technetium, copper and niobium.

7. The method of claim 1, wherein the volatile oxide of $^{99m}$Tc is $Tc_2O_7$.

8. The method of claim 1, wherein the sublimating of said oxidized multicomponent mixture of elements includes separating the vaporized compound containing the volatile oxide of $^{99m}$Tc using a thermal gradient for the separation.

9. The method of claim 1, wherein the sublimating of said oxidized multicomponent mixture of elements includes separating the vaporized compound containing the volatile oxide of $^{99m}$Tc using a differential pressure for the separation.

10. The method of claim 1, further comprising the step of: removing traces of copper from the condensed reaction product by a clean-up procedure.

11. The method of claim 1, wherein the condenser unit is generally of a funnel shaped configuration adapted to capture the vaporized compound containing the volatile oxide of $^{99m}$Tc to form the condensed reaction product.

* * * * *